(12) United States Patent
Lei et al.

(10) Patent No.: US 11,864,643 B2
(45) Date of Patent: Jan. 9, 2024

(54) HAIR DRYER SYSTEM AND RECHARGEABLE SOCKET THEREOF

(71) Applicant: SHENZHEN CARKU TECHNOLOGY CO., LIMITED, Guangdong (CN)

(72) Inventors: Yun Lei, Guangdong (CN); Chuwei Liu, Guangdong (CN); Yubin Zhang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 0 days.

(21) Appl. No.: 17/843,804

(22) Filed: Jun. 17, 2022

(65) Prior Publication Data

US 2022/0312926 A1 Oct. 6, 2022

Related U.S. Application Data

(63) Continuation of application No. 17/318,599, filed on May 12, 2021, now Pat. No. 11,388,972.

(30) Foreign Application Priority Data

Nov. 10, 2020 (CN) .......................... 202022590388.9

(51) Int. Cl.
 A45D 20/12 (2006.01)
 H02J 7/00 (2006.01)
(52) U.S. Cl.
 CPC ............ *A45D 20/12* (2013.01); *H02J 7/0044* (2013.01); *H02J 7/0045* (2013.01); *A45D 2020/128* (2013.01)

(58) Field of Classification Search
 CPC . A45D 20/12; A45D 2020/128; H02J 7/0044; H02J 7/0045
 See application file for complete search history.

(56) References Cited

U.S. PATENT DOCUMENTS

2002/0157276 A1    10/2002 Mujica
2020/0085258 A1*    3/2020 Yoo .................. A45D 20/12
2020/0085262 A1*    3/2020 Youn ................ A45D 20/12

FOREIGN PATENT DOCUMENTS

CN         2545727 Y     4/2003
CN       201327901 Y    10/2009
(Continued)

OTHER PUBLICATIONS

English translation, KR-20110017661-A, Feb. 2011 (Year: 2011).*
(Continued)

*Primary Examiner* — Jessica Yuen
(74) *Attorney, Agent, or Firm* — HAUPTMAN HAM, LLP

(57) ABSTRACT

A hair dryer system includes a hair dryer and a rechargeable socket for charging the hair dryer. The hair dryer defines a plurality of air inlet holes. The rechargeable socket includes a pedestal defining a receiving space and a rechargeable assembly. A top of the pedestal is recessed to form a plug-in part defining a plug-in space. The plug-in part defines a plurality of air holes. The pedestal defines a plurality of air grooves in air communication with an outside of the pedestal. When the hair dryer is charged by the rechargeable assembly, the plurality of air inlet holes are in air communication with the plurality of air holes and the plurality of air grooves. Such that the hair dryers can be used while charging, which is convenient to use.

19 Claims, 6 Drawing Sheets

(56) References Cited

FOREIGN PATENT DOCUMENTS

| | | | |
|---|---|---|---|
| CN | 106805441 | A | 6/2017 |
| CN | 110916548 | A | 3/2020 |
| CN | 210184823 | U | 3/2020 |
| CN | 20200033127 | A | 3/2020 |
| CN | 211183452 | U * | 8/2020 |
| EP | 0462027 | B1 | 5/1995 |
| EP | 3626111 | A1 | 3/2020 |
| JP | S57112816 | A | 7/1982 |
| JP | H04103807 | U | 9/1992 |
| JP | 2006-139982 | A | 6/2006 |
| JP | 2017-140364 | A | 8/2017 |
| JP | 3222699 | U | 8/2019 |
| KR | 20110017661 | A * | 2/2011 |
| WO | 0154536 | A1 | 8/2001 |
| WO | 2007010321 | A1 | 1/2007 |

OTHER PUBLICATIONS

The Extended European Search Report issued in corresponding EP Application No. EP21185040.9, dated Dec. 21, 2021.
The International Search Report issued in corresponding PCT Application No. PCT/CN2021/092381, dated Aug. 11, 2021.

* cited by examiner

HAIR DRYER SYSTEM AND RECHARGEABLE SOCKET THEREOF

CROSS-REFERENCE TO RELATED APPLICATION

This application is a continuation of U.S. patent application Ser. No. 17/318,599, filed on May 12, 2021, which claims priority to and the benefit of Chinese Application Patent No. 202022590388.9, filed on Nov. 10, 2020, and titled "wireless hair dryer and rechargeable socket thereof". The entire disclosure of which is hereby incorporated by reference in its entirety.

TECHNICAL FIELD

The present disclosure relates to the technical field of a hair dryer, and more particularly to a hair dryer system and a rechargeable socket.

BACKGROUND

Currently, when traditional wired hair dryers on the market are in daily use, the existing hair dryers cannot be used while charging. Such that it is inconvenient to use and the user experience is poor.

SUMMARY

The purpose of the present disclosure is aim to provide a rechargeable socket and a hair dryer system including the rechargeable socket, which are convenient to use.

In order to solve the above problem, the present disclosure provides a hair dryer system and a rechargeable socket. The hair dryer is charged by the rechargeable socket. The hair dryer defines a plurality of air inlet holes. The rechargeable socket includes a pedestal defining a receiving space and a rechargeable assembly. The top of the pedestal is recessed to form a plug-in part. The plug-in part defines a plug-in space. The plug-in part defines a plurality of air holes in air communication with the plug-in space and the receiving space. The pedestal defines a plurality of air grooves in air communication with an outside of the pedestal. When the hair dryer is charged by the rechargeable assembly, the plurality of air inlet holes are in air communication with the plurality of air holes and the plurality of air grooves.

The present disclosure provides the hair dryer system including a hair dryer and a rechargeable socket for charging the hair dryer. The rechargeable socket includes a pedestal defining a receiving space and a rechargeable assembly arranged in the receiving space. A top of the pedestal is recessed to form a plug-in part, and the plug-in part defines a plug-in space. The plug-in part defines a plurality of air holes in air communication with the plug-in space and the receiving space. The pedestal defines a plurality of air grooves in air communication with an outside of the pedestal. When the hair dryer is charged by the rechargeable socket, the plurality of air inlet holes are in air communication with the plurality of air holes and the plurality of air grooves, such that the hair dryers can be used while charging, which is convenient to use.

BRIEF DESCRIPTION OF THE DRAWINGS

In order to more clearly illustrate the technical solution of the present disclosure, the accompanying drawings required for describing the embodiments or the prior art will be briefly described below. Apparently, the accompanying drawings in the following description are merely the embodiments of the present disclosure, and other drawings may be obtained by those skilled in the art according to these accompanying drawings without paying any creative labor.

DETAILED DESCRIPTION

Figure 1:
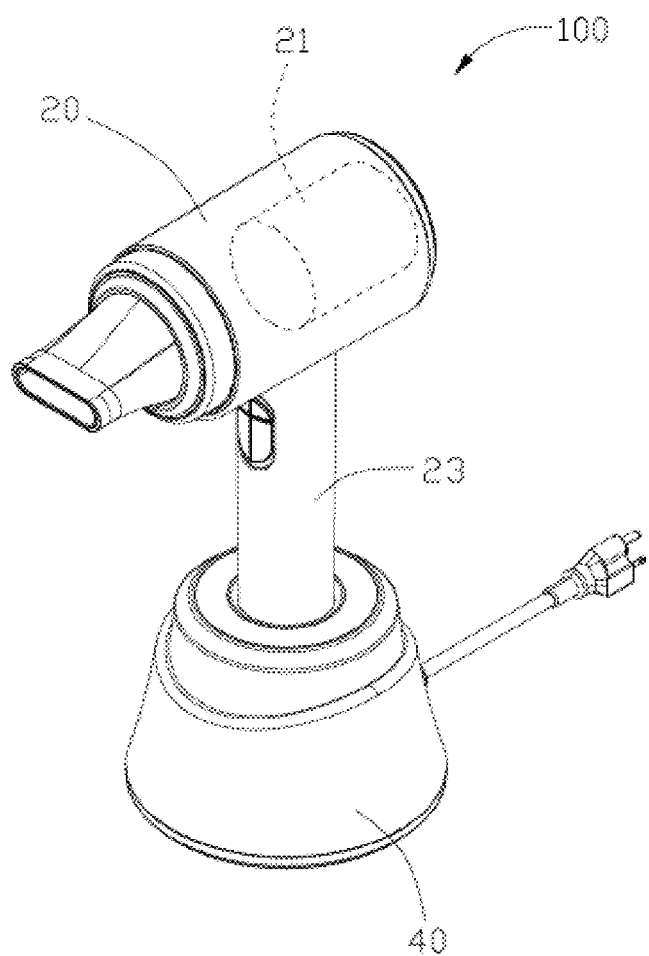
FIG. 1 is a schematic diagram of a three-dimensional structure of a wireless hair dryer system provided by an embodiment of the present disclosure.

The technical solutions in the embodiments of the present disclosure will be clearly and completely described in the following with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the description of the embodiments of the present disclosure, it should be apprehended that the orientation or positional relationship indicated by the terms, such as the term "thickness", is based on the orientation or positional relationship shown in the drawings, and is only for the convenience of describing the present disclosure and simplifying the description. It does not imply or indicate that the pointed device or element must be in a specific orientation, or be constructed and operated in a specific orientation, therefore cannot be understood as a limitation of the present disclosure.

As illustrated in FIG. 1 to FIG. 4, the present disclosure provides a wireless hair dryer system 100, which includes a wireless hair dryer 20, a rechargeable battery 21 arranged in the wireless hair dryer 20, and a rechargeable socket 40. The wireless hair dryer 20 includes a handle 23 and an air duct 24 arranged on an end of the handle 23. The rechargeable battery 21 is arranged in the air duct 24. The end of the handle 23 arranges a rechargeable connector 25 electrically coupled to the rechargeable battery 21. The rechargeable socket 40 is configured to charge the rechargeable battery 21. The rechargeable socket 40 includes a hollow pedestal 41 and a rechargeable assembly 43 arranged in an inner cavity of the pedestal 41. A top of the pedestal 41 is recessed to form a plug-in part 410. The rechargeable assembly 43 includes a circuit board 431 and a rechargeable terminal 433 electrically coupled to the circuit board 431. The rechargeable terminal 433 passes through the plug-in part 410 and extends to the inner cavity of the plug-in part 410. The circuit board 431 arranges a transformer. The current can convert an alternating current into a direct current for charging the wireless hair dryer 20. The end of the handle 23 is inserted into the inner cavity of the plug-in part 410 until the rechargeable terminal 433 to be in contact with the rechargeable connector 25. In process of the handle 23 rotatable relative to the plug-in part, the rechargeable terminal 433 is kept in contact with the rechargeable connector 25, that is, the rechargeable terminal 433 is always electrically coupled to the rechargeable connector 25.

In the embodiment, the handle 23 can be inserted in the inner cavity of the plug-in part 410. In process of the handle 23 rotatable relative to the plug-in part 410 at any angle, the rechargeable terminal 433 is slidably contacted with the rechargeable connector 25, and the rechargeable terminal 433 is always electrically coupled to the rechargeable connector 25. That is, as long as the handle 23 is inserted into the inner cavity of the plug-in part 410, the rechargeable terminal 433 can be kept in contact with the rechargeable connector 25.

The present disclosure provides the wireless hair dryer system 100 including the rechargeable socket 40, which is provided with the plug-in part 410, and the wireless hair dryer 20. The rechargeable terminal 433 on the circuit board 431 of the wireless hair dryer 20 passes through the plug-in part 410 and extends to the inner cavity of the plug-in part 410. When the end of the handle 23 is inserted into the inner cavity of the plug-in part 410, the rechargeable connector 25 at the end of the handle 25 is contacted with the rechargeable terminal 433. No matter the handle 23 rotates relative to the plug-in part 410 at any angle, the rechargeable terminal 433 is always electrically coupled to the rechargeable connector 25 to allow the rechargeable socket 40 to charge the rechargeable battery 21. That is, the wireless hair dryer 20 can be charged immediately after being inserted into the rechargeable socket 40, which is convenient to use and reduces a failure probability of the charging the wireless hair dryer 20. Such that the plug-and-play effect can be achieved, and a damage caused by insufficient air intake when the product is activated in a specific situation can be effectively avoided.

In other embodiments, the rechargeable battery 21 can also be arranged in an inner cavity of the handle 23. The rechargeable connector 25 can be coupled to the rechargeable battery 21 by a wire.

Figure 2:
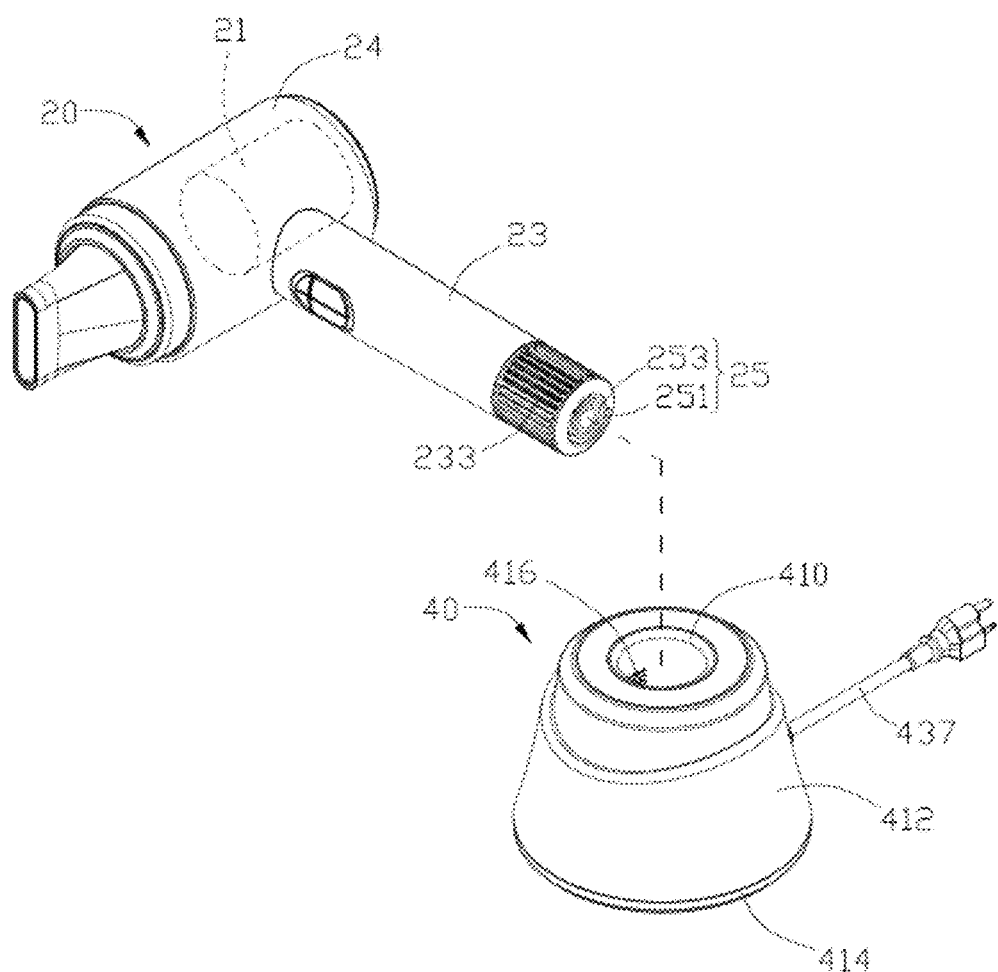
FIG. 2 is an exploded schematic view of the three-dimensional structure of a wireless hair dryer and a rechargeable socket of the wireless hair dryer system of FIG. 1.
Figure 3:
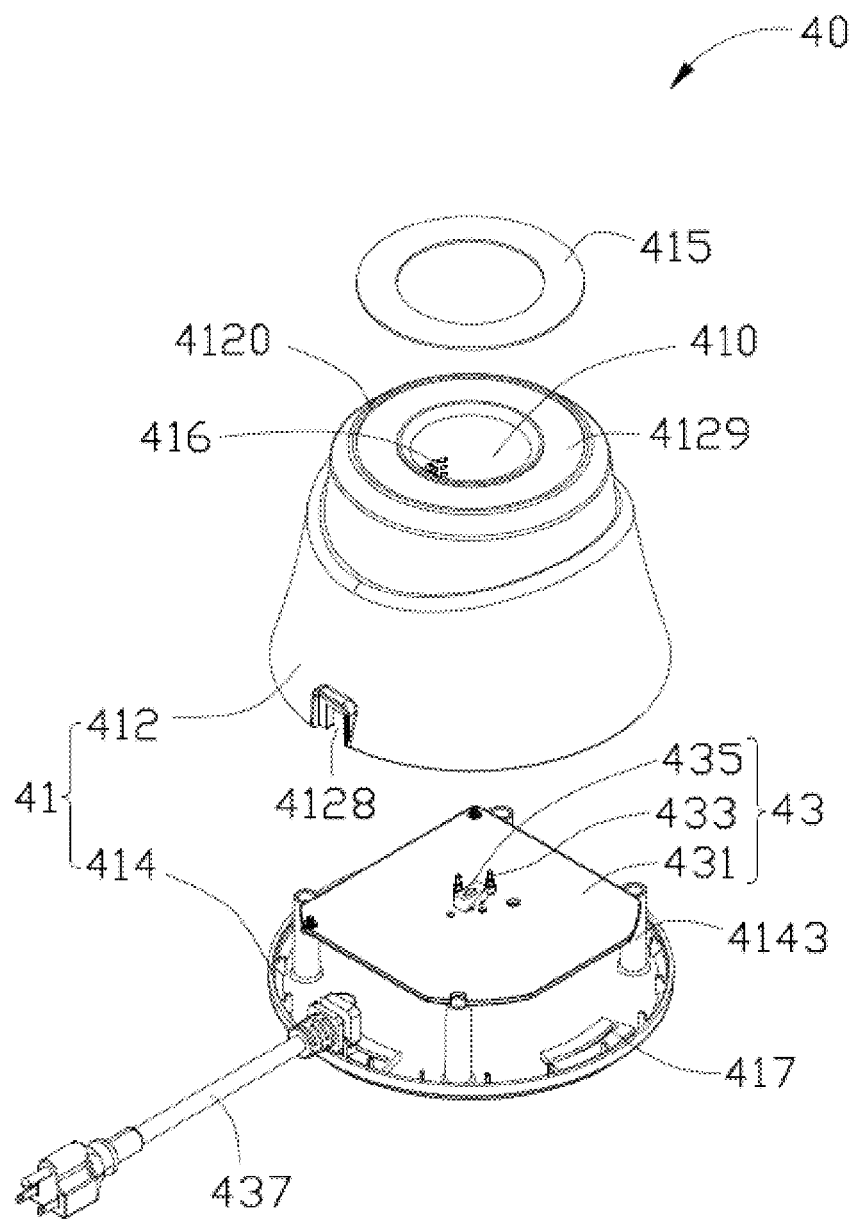
FIG. 3 is an exploded schematic view of the three-dimensional structure of the rechargeable socket of FIG. 2.
Figure 4:
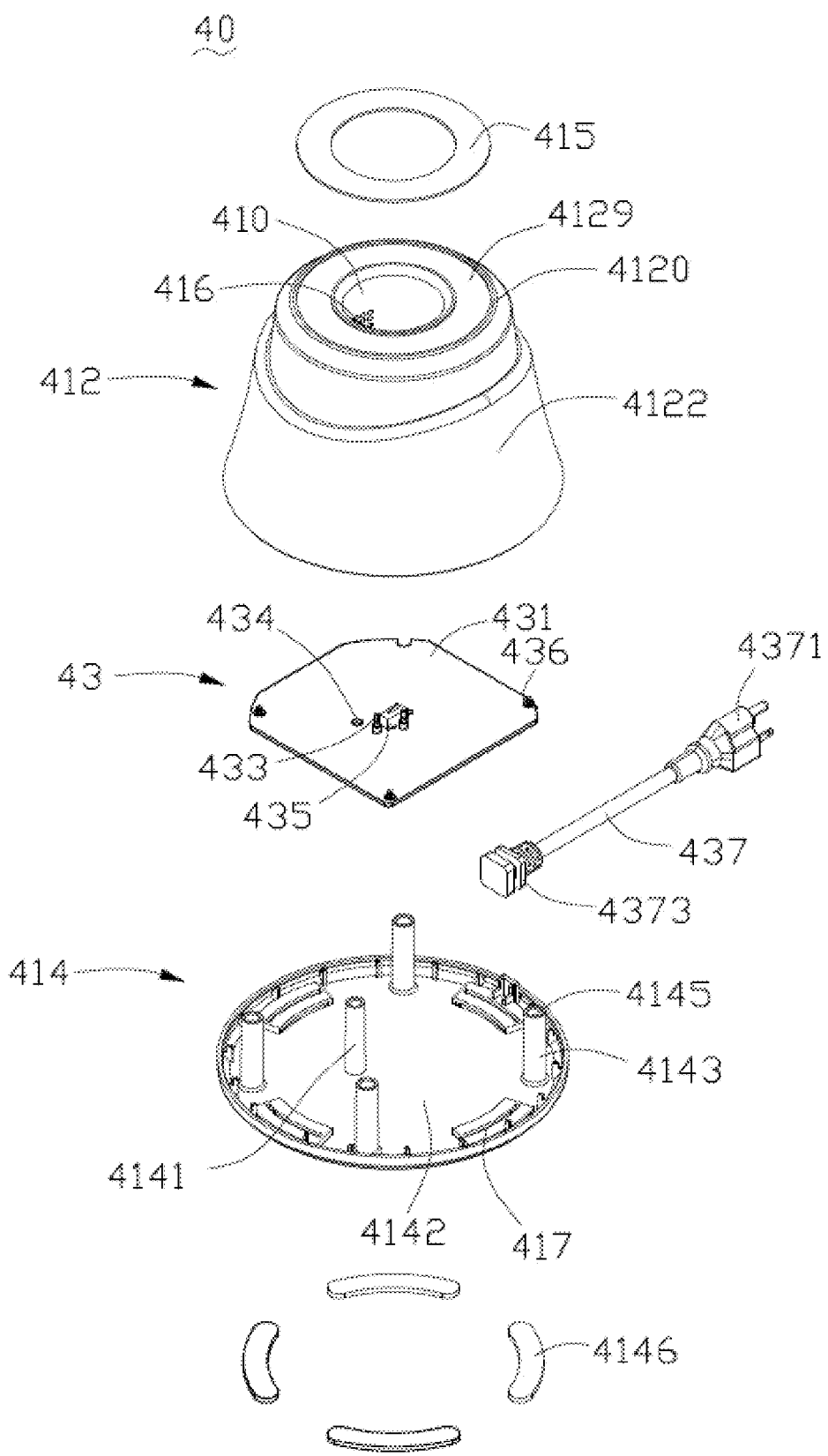
FIG. 4 is a further exploded schematic view of the three-dimensional structure of the rechargeable socket of FIG. 3.
Figure 5:
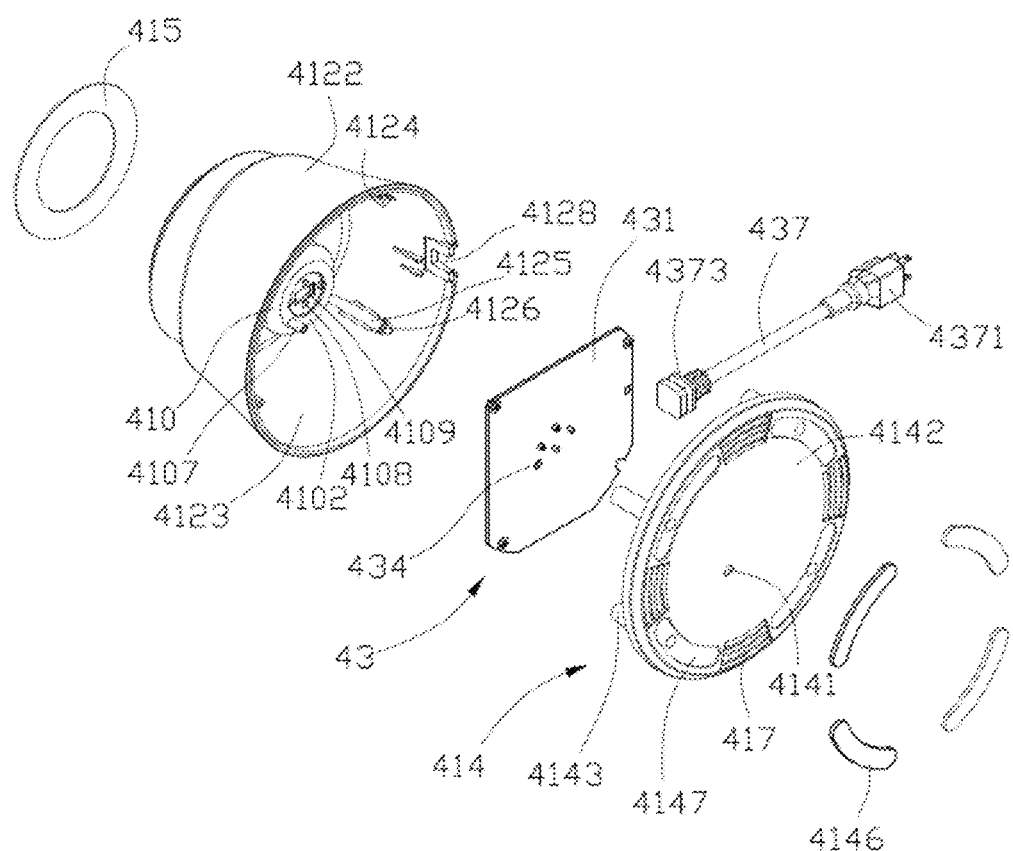
FIG. 5 is the schematic view of the three-dimensional structure of the rechargeable socket of FIG. 4, but viewed from another aspect.
Figure 6:
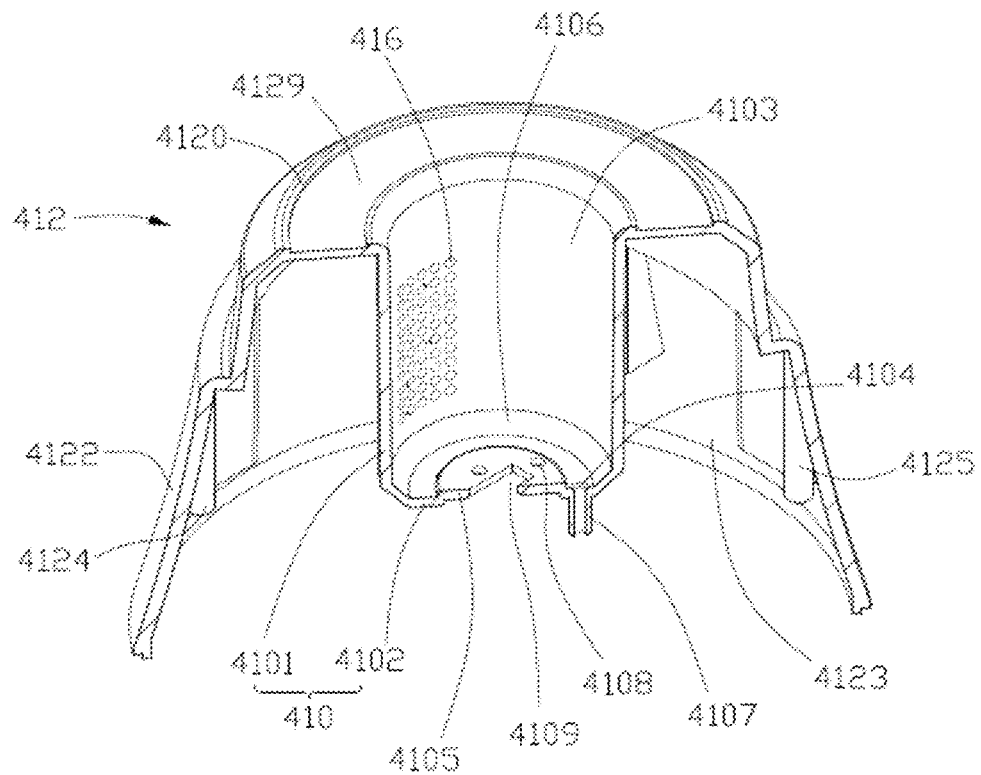
FIG. 6 is a cross-sectional view of an upper housing of the rechargeable socket of FIG. 4.
Figure 7:
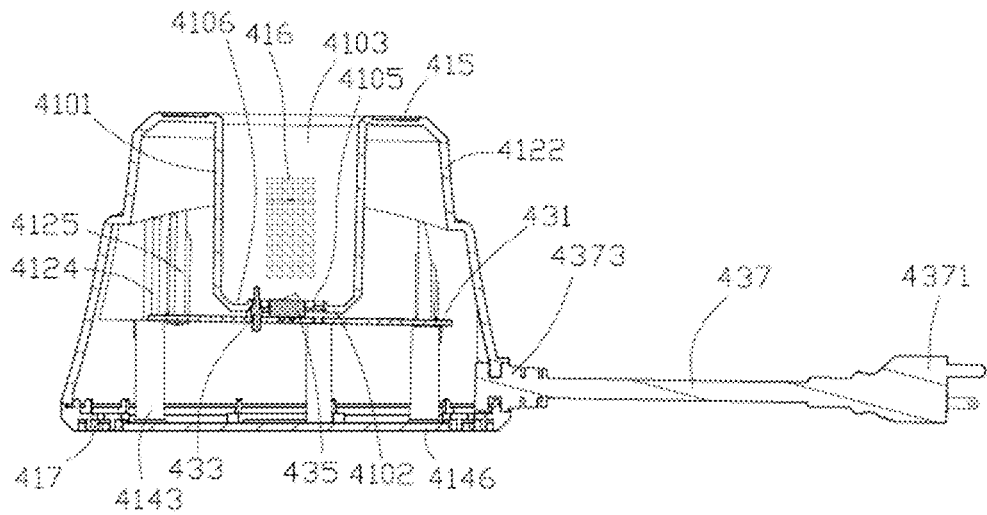
FIG. 7 is a cross-sectional view of the rechargeable socket of FIG. 2.

As illustrated in FIG. 2, the rechargeable connector 25 is an annular conducting strip. When the end of the handle 23 is inserted into the plug-in part 410, the rechargeable terminal 433 is in contact with the conducting strip. In process of the rechargeable connector 25 rotatable with the handle 23 relative to the pedestal 41, the rechargeable terminal 433 is kept in sliding contact with the conducting strip. That is, a radial dimension from the rechargeable terminal 433 to a rotation axis of the handle 23 is within a width of the conducting strip. Specifically, the rechargeable connector 25 includes an annular positive electrode tab 251 and an annular negative electrode tab 253. A radial dimension of the positive electrode tab 251 is greater than a radial dimension of the negative electrode tab 253. The rechargeable connector 25 includes a plurality of conducting strips. In one embodiment, the plurality of conducting strips includes one positive electrode tab 251 and one negative electrode tab 253, and the positive electrode tab 251 is arranged around one negative electrode tab 253. In other embodiments, the plurality of conducting strips includes a plurality of positive electrode tabs 251 and one negative electrode tab 253, and the plurality of positive electrode tabs 251 are arranged around the negative electrode tab 253 at intervals. The rechargeable terminal 433 includes a first rechargeable terminal and a second rechargeable terminal, which are arranged at intervals. The first rechargeable terminal and the second rechargeable terminal of the rechargeable terminal 433 are elastic thimbles. When the end of the handle 23 is inserted into the plug-in part 410, the elastic thimbles slidably contact the positive electrode tab 251 and the negative electrode tab 253, respectively. In a process of the handle 23 rotatable relative to the pedestal 41, the elastic thimbles are always kept in sliding contact with corresponding conducting strips. Preferably, an outer surface of the elastic thimble is provided with a conductive coating layer, such as gold plating, rhodium and ruthenium plating, thus improving electrical properties and friction of the elastic thimble.

The positive electrode tab 251 and the negative electrode tab 253 are made of conductive material, such as copper. Preferably, outer surfaces of the positive electrode tab 251 and the negative electrode tab 253 are provided with coating layers, such as gold plating, rhodium and ruthenium plating, thus improving the electrical properties and friction, and thereby making the charging efficiency of the rechargeable socket 40 higher and the service life more longer.

The positive electrode tab 251 and the negative electrode tab 253 can be fixed to an end surface of the handle 23 by pasting, clamping, or screwing. The positive electrode tab 251 and the negative electrode tab 253 can be also fixed on the end surface of the handle 23 by encapsulation injection molding. Preferably, side surfaces of the positive electrode tab 251 and the negative electrode tab 253 facing away from the handle 23 are coplanar.

As illustrated in FIG. 3 to FIG. 6, the pedestal 41 includes an upper housing 412 and a lower housing 414. The upper housing 412 can be coupled to the lower housing 414 by buckling. The upper housing 412 includes a top plate 4120 and a side plate 4122 surrounding the top plate 4120. A middle of the top plate 4120 is recessed toward an inner cavity of the upper housing 412 to form the plug-in part 410. In the embodiment, the upper housing 412 is substantially a circular truncated cone cavity structure, that is, the top plate 4120 is a circular plate, and the side plate 4122 is arranged around an outer periphery of the top plate 4120 in a circle. A receiving space 4123 is formed by the top plate 4120 and the side plate 4122. The rechargeable assembly 43 is received in the receiving space 4123. The plug-in part 410 extends from the top plate 4120 into the receiving space 4123. Preferably, a radial dimension of the receiving space 4123 gradually increases from a first end of the upper housing 412 adjacent to the top plate 4120 to a second end of the upper housing 412 away from the top plate 4120. That is, an area of the top plate 4120 is less than an area enclosed by a lateral border of the side plate 4122 away from the top plate 4120, thus stably placing the pedestal 41.

The plug-in part 410 includes a plug-in duct 4101 coupled to the upper housing 412 of the rechargeable socket 40 and a connecting plate 4102 arranged at a bottom of the plug-in duct 4101. A plug-in space 4103 is formed by the plug-in duct 4101 and the connecting plate 4102. The handle 23 is received in the plug-in space 4103. The connecting plate 4102 defines a diversion hole 4104. The diversion hole 4104 is in liquid communication with an outside of the rechargeable socket 40. The diversion hole 4104 is configured to drain liquid, such as water, which is mistakenly flowed into the plug-in duct 4101, outside of the rechargeable socket 40, which plays a role of dredging and avoids a short circuit, damage, or other abnormal situations of the wireless hair dryer system 100 caused by the liquid contacted with the rechargeable terminal 433 and/or the rechargeable connector 25.

In the embodiment, the plug-in duct 4101 is a circular duct. The plug-in duct 4101 extends from the middle of the top plate 4120 toward the receiving space 4123 along an axial direction of the pedestal 41. A cross section of the plug-in duct 4101 can be substantially circular. An inner diameter of the plug-in duct 4101 is substantially greater than a diameter of the end of the handle 23, thus facilitating the insertion or removal of the end of the handle 23.

In other embodiments, a cross section of the plug-in duct 4101 may also be substantially rectangular, elliptical, polygonal, etc. The end of the handle 23 is correspondingly constructed as a rectangular column, an elliptical column, or a polygonal column. Such that the end of the handle 23 can be easily inserted in or removed from the plug-in space 4103 and the rechargeable connector 25 on the handle 23 can be kept in contact with the rechargeable terminal 433 of the rechargeable socket 40.

In other embodiments, the upper housing 412 may also be a rectangular cavity, an elliptical cavity, a polygonal cavity, etc., that is, the top plate 4120 is a rectangular plate, an elliptical plate, a polygonal plate, etc. The side plate 4122 is arranged around the outer periphery of the top plate 4120 in a circle.

A middle of the connecting plate 4102 is provided with a boss 4105 protruding toward the plug-in space 4103. The rechargeable terminal 433 passes through the boss 4105 and extends into the plug-in space 4103. Specifically, a middle of a surface of the connecting plate 4102 facing toward the plug-in space 4103 protrudes toward the plug-in space 4103 to form the boss 4105. The rechargeable terminal 433 is arranged on the boss 4105.

A diversion groove 4106 is formed on the connecting plate 4102 around the boss 4105. The diversion hole 4104 is in liquid communication with the diversion groove 4106. Specifically, a distance between a surface of the boss 4105 facing toward the plug-in space 4103 and the top plate 4120 is greater than a distance between a surface of the connecting plate 4102 facing toward the plug-in space 4103 and the top plate 4120. The connecting plate 4102 and the diversion hole 4104 cooperatively form the diversion groove 4106. The diversion hole 4104 is defined on a bottom of the diversion groove 4106. Preferably, a bottom surface of the diversion groove 4106 is inclined to the diversion hole 4104, such that the liquid in the diversion groove 4106 can more easily flow into the diversion hole 4104.

In the embodiment, the diversion hole 4104 is in liquid communication with an outside of the pedestal 41 by a diversion tube 4107. Specifically, the liquid in the diversion groove 4106 is drained the outside of the pedestal 41 by the diversion hole 4104 and the diversion tube 4107.

In the embodiment, the connecting plate 4102 defines a plurality of plug-in holes 4108 and a positioning hole 4109. Both the plurality of plug-in holes 4108 and the positioning hole 4109 extends through the connecting plate 4102. The plurality of plug-in holes 4108 are configured for the rechargeable terminals 433 to insert. Preferably, the plurality of plug-in holes 4108 and the positioning hole 4109 are both located on the boss 4105, the plurality of plug-in holes 4108 and the positioning hole 4109 extends through the boss 4105, and the plurality of plurality of plug-in holes 4108 are distributed around the positioning hole 4109. The rechargeable assembly 43 further includes an induction switch 435 electrically coupled to the circuit board 431. The positioning hole 4109 is configured to position the induction switch 435.

The upper housing 412 defines a plurality of positioning columns 4124 and a plurality of connecting columns 4125. The plurality of positioning columns 4124 and the plurality of connecting columns 4125 are configured for positioning the circuit board 431 to the inner cavity of the pedestal 41. In the embodiment, the plurality of positioning columns 4124 are arranged on an inner side surface of the side plate 4122 and arranged along a circumferential direction of the side plate 4122. The plurality of connecting columns 4125 are arranged on the inner side surface of the side plate 4122 and are arranged along the circumferential direction of the side plate 4122. Each the plurality of connecting columns 4125 defines a connecting hole 4126 along an axial direction thereof. The rechargeable assembly 43 further includes a power cord 437 electrically coupled to the circuit board 431. The upper housing 412 defines a clamping groove 4128 configured for positioning the power cord 437. Specifically, the clamping groove 4128 is arranged on a side of the side plate 4122 away from the top plate 4120.

The pedestal 41 further includes a pedestal decorative sheet 415 arranged on the top surface of the upper housing 412. Specifically, the pedestal decorative sheet 415 is an annular sheet. The top surface of the top plate 4120 defines an annular engaging groove 4129 around the plug-in space 4103. The pedestal decorative sheet 415 is fixed in the engaging groove 4129 by clamping, gluing, or screwing.

The induction switch 435 can be a touch switch, an infrared switch, etc. The circuit board 431 is electrically coupled to an external power source by the power cord 437. The circuit board 431 controls a working state of the charging socket 40 by receiving a signal sent by the induction switch 435, that is, the circuit board 431 is configured to control the rechargeable socket 40 to charge the wireless hair dryer 20 according to the signal sent by the inductive switch 435. In the embodiment, the induction switch 435 is arranged on the circuit board 431, and a plurality of rechargeable terminals 433 are provided on the circuit board 431 around the induction switch 435. Each of plurality of rechargeable terminals 433 has elasticity, to allow the plurality of rechargeable terminals 433 to be fixedly in contact with the rechargeable connector 25. The circuit board 431 defines a through hole 434. The through hole 434 is configured for the pedestal 41 to insert. Specifically, the through hole 434 is configured for the diversion tube 4107 to pass through. A periphery of the circuit board 431 defines a plurality of through holes 436. The plurality of through holes 436 correspond one to one to the connecting holes of the plurality of connecting columns 4125. The power cord 437 includes two opposite ends. One end of the power cord 437 is provided with a plug 4371, and the other end of the power cord 437 is provided with a connecting part 4373. The connecting part 4373 can be clamped in the clamping groove 4128, such that the power cord 437 is positioned in the rechargeable socket 40.

Preferably, the circuit board 431 is also provided with a battery protection circuit module, which is configured to effectively protect the rechargeable battery 21 in the wireless hair dryer 20. That is, the battery protection circuit module is configured to provide over-charge protection, over-discharge protection, over-current protection and short circuit protection for the rechargeable battery 21, thus ensuring the safety and stability of the rechargeable socket 40 in a working process.

The lower housing 414 includes a base plate 4142 that can be buckled to a bottom of the upper housing 412. A surface of the base plate 4142 facing toward the upper housing 412 is provided with a plurality of hooks. The plurality of hooks are configured to fasten a bottom of the side plate 4122, to allow the upper housing 412 to be fixedly coupled to the lower housing 414. The surface of the base plate 4142 facing toward the upper casing 412 is provided with a plurality of supporting columns 4143 and a sleeve 4141. The plurality of supporting columns 4143 correspond one to one to the plurality of positioning columns 4124 of the upper casing 412. The sleeve 4141 passes through the base plate 4142. A top surface of each of the plurality of supporting columns 4143 defines a positioning hole 4145 along an axial direction thereof. A bottom surface of the base plate 4142 is provided with a plurality of gaskets 4146. Specifically, the bottom surface of the base plate 4142 defines a plurality of fixing grooves 4147. The plurality of gaskets 4146 are respectively clamped in the plurality of fixing grooves 4147. Preferably, the plurality of gaskets 4146 is made of soft material, such as silicone, rubber, or sponge.

As illustrated in FIG. 3 to FIG. 7, when assembling the rechargeable socket 40, the circuit board 431 is received in the receiving space 4123. Such that the rechargeable terminals 433 and the induction switch 435 are respectively inserted into the corresponding plug-in holes 4108 and the positioning hole 4109 on the socket 410, and the diversion tube 4107 passes through the through hole 434 of the circuit board 431. At this time, each of the plurality of rechargeable terminals 433 is clamped in an associated plug-in hole 4108. The end of the rechargeable terminal 433 extends into the plug-in space 4103 of the plug-in part 410. The connecting plate 4102 is provided with the induction switch 435, that is, the induction switch 435 is fixed in the positioning hole 4109, and the induction switch 435 partially extends to the plug-in space 4103. A plurality of locking members, such as screws, respectively pass through the through holes 436 of the circuit board 431 and are locked in corresponding connecting holes 4126 to allow the circuit board 431 is fixedly coupled to the upper housing 412. The connecting part 4373 of the power cord 437 is clamped to the clamping groove 4128 of the upper housing 412. The lower housing 414 is buckled to the bottom of the upper housing 412. The plurality of positioning columns 4124 are respectively positioned at the positioning holes 4145 of the supporting columns 4143, and the diversion tube 4107 is inserted into an inner cavity of the sleeve 4141. Such that the upper housing 412 is fixedly coupled to the lower housing 414. The power cord 437 is clamped and positioned by the upper housing 412 and the lower housing 414. The power cord 437 is electrically coupled to the circuit board 431. The pedestal decorative sheet 415 is fixed to the engaging groove 4129. The plurality of gaskets 4146 are fixedly installed in the plurality of fixing grooves 4147, respectively.

Alternatively, a peripheral wall of the handle 23 defines a plurality of air inlet holes 233. The wireless hair dryer 20 defines a plurality of air outlet holes in air communication with the plurality of air inlet holes 233. In one embodiment, the wireless hair dryer 20 can operate alone, that is, the rechargeable battery 25 provides electric power for the wireless hair dryer 20 to work. Specifically, when the wireless hair dryer system 100 is started to work after the handle 23 is removed from the plug-in part 410, external air enters the wireless hair dryer 20 by the plurality of air inlet holes 233, and then is discharged from the plurality of air outlet holes of the wireless hair dryer 20.

Alternatively, in another embodiment, the wireless hair dryer 20 is started to work before the handle 23 is inserted in the plug-in part 410 of the rechargeable socket 40, that is, the rechargeable socket 40 provides power for the wireless hair dryer 20 to work. Specifically, a peripheral wall of the handle 23 defines a plurality of air inlet holes 233. The wireless hair dryer 20 defines a plurality of air outlet holes in air communication with the plurality of air inlet holes 233. The upper housing 412 of the pedestal 41 defines a plurality of air holes 416. The lower housing 414 defines a plurality of air grooves 417. Specifically, the plurality of air holes 416 are defined on the plug-in duct 4101 of the upper housing 412. Each of the plurality of air holes 416 is in air communication with the plug-in space 4103 and the receiving space 4123. The plurality of air grooves 417 are defines on the base plate 4142 of the lower housing 414. The plurality of air grooves 417 are in air communication with the receiving space 4123 and an outside of the pedestal 41. When the handle 23 is inserted into the plug-in space 4103, and the plurality of air holes 416 are faced to the plurality of air inlet holes 233 of the handle 23, such that more air can enter the wireless hair dryer 20. Such that, the plurality of air holes 416 are in air communication with the plurality of air grooves 417, that is, the external air enters the receiving space 4123 by the plurality of air grooves 417, and then enters the plug-in space 4103 by the plurality of air holes 416. The circuit board is fixed on the base plate 4142, and the plurality of air grooves 417 are arranged outside an area of the base plate 4142 corresponding to the circuit board 431, thus reducing the wind resistance. The plurality of the air grooves 417 are evenly arranged on an edge of the base plate 4142, thus improving the outlet uniformity. The gasket 4146 is arranged on a side of the lower housing 414 away from the upper housing 412, and the gasket 4146 is arranged between two adjacent air grooves 417. Such that the rechargeable socket 40 is advanced design, compact structure, high reliability.

When the wireless hair dryer system 100 is working, the handle 23 is inserted into the plug-in part 410. At this time, the plurality of air grooves 417 and the plurality of air holes 416 are in air communication with the plurality of air inlet holes 233. specifically, if the wireless hair dryer 20 is activated during a charging process, the external air passes through the plurality of air grooves 417 of the pedestal 41, the receiving space 4123, the plurality of air holes 416, and the plurality of air inlet holes 233 of the handle 23, to enter the wireless hair dryer 20. The external air passed through the wireless hair dryer 20 is discharged from the plurality of air outlet holes of the wireless hair dryer 20, thus preventing the wireless hair dryer system 100 from being damaged without air. Specifically, the plurality of air holes 416 defined on the plug-in duct 4101 corresponds to the plurality of air inlet holes 233 of the handle 23. The plurality of air grooves 417 are provided on the periphery of the base plate 4142. When the wireless hair dryer 20 inserted in the plug-in part 410 is activated, the external air passes through the plurality of air grooves 417 of the base plate 4142 and the v plurality of air holes 416 on the plug-in duct 4101, and then enters the plurality of air inlet holes 233 of the handle 23.

When the wireless hair dryer 20 needs to be charged, the plug 4371 of the power cord 437 is inserted into a socket of the external power source to keep the charging socket 40 energized. The handle 23 is inserted into the plug-in space 4103 of the plug-in part 410, the plurality of rechargeable terminals 433 is elastically contacted with corresponding positive electrode tab 251 and the negative electrode tab 253. The induction switch 435 is triggered to send a signal to the circuit board 431. The circuit board 431 receives the signal and controls the plurality of rechargeable terminals 433 to output a current to charge the rechargeable battery 21 according the signal. Since the positive electrode tab 251 and the negative electrode tab 253 are annular conducting strips, in process of the handle 23 rotatable relative to the plug-in part 410 at any angle, the plurality of rechargeable terminals 433 will always elastically abut against the corresponding positive electrode tab 251 and the negative electrode tab 253. Therefore, the rechargeable battery 21 can be continuously charged by the rechargeable socket 40. It is understandable that, the handle 23 can be inserted into the plug-in part 410 at any angle relative to the charging socket 40, to allow the rechargeable terminal 433 to be electrically in contact with the rechargeable connector 25, thus achieving a plug-and-play effect, being convenient to use, and thereby improving the charging efficiency.

If water and other liquid is mistakenly flowed into the plug-in space 4103 of the rechargeable socket 40, the water and other liquids flowing through the diversion groove 4106, the diversion hole 4104, the diversion tube 4107, and the sleeve 4141 will be discharged from the pedestal 41 immediately, thus avoiding short circuits and other abnormal conditions.

In other embodiments, the diversion tube 4107 and the sleeve 4141 can be made in one piece; or the sleeve 4141 is omitted, that is the diversion tube 4107 directly extends out of the pedestal 41.

In other embodiments, water absorbing material, such as sponge, can also be arranged in the diversion groove 4106 to immediately absorb the water and other liquid, which is mistakenly flowed into the plug-in space 4103.

In other embodiments, the charging contact mode between the rechargeable battery 21 and the rechargeable socket 40 may also be a wireless charging mode, or a plug-socket mode, etc.

In other embodiments, the rechargeable connector 25 may also be a rectangular conducting strip, an elliptical conducting strip, or other shaped conducting strips, as long as the handle 23 received in the plug-in space 4103 rotates relative to the plug-in part 410 at any angle, the rechargeable terminal 433 is electrically coupled to the rechargeable connector 25.

The foregoing description merely depicts some exemplary embodiments of the disclosure. It should be understood that, those skilled in the art may also make a plurality of improvements and refinements without departing from the principles of the present disclosure. The plurality of improvements and refinements should all be encompassed within the protection of the present disclosure.

What is claimed is:

1. A rechargeable socket for charging a hair dryer, wherein the rechargeable socket comprises:
   a pedestal, defining a receiving space; and
   a rechargeable assembly;
   wherein a top of the pedestal is recessed to form a plug-in part, the plug-in part defines a plug-in space, the plug-in part defines a plurality of air holes in air communication with the plug-in space and the receiving space; the pedestal defines a plurality of air grooves in air communication with an outside of the pedestal, and when the hair dryer is charged by the rechargeable assembly, the plurality of air holes and the plurality of air grooves are in air communication with a plurality of air inlet holes defined by the hair dryer, and
   wherein the rechargeable assembly comprises a rechargeable terminal, a bottom of the plug-in part is provided with a boss protruding toward the plug-in space, and the rechargeable terminal passing through the boss extends to the plug-in space.

2. The rechargeable socket of claim 1, wherein the hair dryer comprises a handle, the handle defines the plurality of air inlet holes; and when the handle is inserted into the plug-in space, the plurality of air inlet holes are in air communication with the plurality of air holes and the plurality of air grooves, and the plurality of air holes are faced to the plurality of air inlet holes.

3. The rechargeable socket of claim 1, wherein the plug-in part comprises a plug-in duct coupled to a top of the rechargeable socket and a connecting plate arranged at a bottom of the plug-in duct; the plug-in space is formed by the plug-in duct and the connecting plate; and the plurality of air holes are defined on the plug-in duct.

4. The rechargeable socket of claim 1, wherein when the hair dryer is charged by the rechargeable socket and the hair dryer works, outside air passes through the plurality of air grooves, the receiving space, the plurality of air holes, the plug-in space, and the plurality of air inlet holes in sequence.

5. The rechargeable socket of claim 1, wherein the plurality of air grooves are defined at a bottom of the pedestal.

6. The rechargeable socket of claim 1, wherein the pedestal comprises an upper housing and a lower housing coupled to the upper housing, the upper housing and the lower housing cooperatively form the receiving space for received the rechargeable assembly, and the plug-in part extends from a top end of the upper housing toward the receiving space along an axial direction of the pedestal.

7. The rechargeable socket of claim 6, wherein the lower housing comprises a base plate buckled to a bottom of the upper housing, and the plurality of air grooves are defined on the base plate.

8. The rechargeable socket of claim 7, wherein the rechargeable assembly comprises a circuit board, the circuit board is fixed on the base plate, and the plurality of air grooves are arranged outside an area of the base plate corresponding to the circuit board.

9. The rechargeable socket of claim 7, wherein the plurality of the air grooves are evenly arranged on an edge of the base plate.

10. The rechargeable socket of claim 6, wherein the rechargeable socket further comprises a gasket arranged on a side of the lower housing away from the upper housing, and the gasket is arranged between two adjacent air grooves.

11. The rechargeable socket of claim 1, wherein a diversion groove is formed on the bottom of the plug-in part around the boss.

12. The rechargeable socket of claim 11, wherein water absorbing material is arranged in the diversion groove.

13. The rechargeable socket of claim 11, wherein the bottom of the plug-in part defines a diversion hole in liquid communication with the diversion groove, and the diversion hole is in liquid communication with the outside of the pedestal by a diversion tube.

14. The rechargeable socket of claim 13, wherein the rechargeable assembly comprises a circuit board and a rechargeable terminal electrically coupled to the circuit board; the rechargeable terminal passing through the boss extends to the plug-in space; and the circuit board defines a through hole for the diversion tube passing through.

15. The rechargeable socket of claim 13, wherein the pedestal is provided with a sleeve in liquid communication with the diversion tube and the outside of the pedestal, and an end of the sleeve is sleeved on the diversion tube, and another end of the sleeve is fixedly coupled to the pedestal.

16. The rechargeable socket of claim 15, wherein the sleeve and the diversion tube are made in one piece.

17. The rechargeable socket of claim 1, wherein a bottom of the plug-in part defines a diversion hole, and the diversion hole is in liquid communication with an outside of the rechargeable socket.

18. The rechargeable socket of claim 1, wherein the hair dryer comprises a handle, the rechargeable assembly comprises a circuit board and a rechargeable terminal electrically coupled to the circuit board; the rechargeable terminal is connected with a rechargeable connector arranged at an end of the handle, the rechargeable connector is an annular conducting strip; and a radial dimension from the rechargeable terminal to a rotation axis of the handle is within a width of the conducting strip.

19. A hair dryer system, comprising a hair dryer and the rechargeable socket of claim 1, wherein the hair dryer is charged by the rechargeable socket.

\* \* \* \* \*